(12) United States Patent
Tsukamoto et al.

(10) Patent No.: US 11,402,360 B2
(45) Date of Patent: Aug. 2, 2022

(54) MONITORING METHOD, MONITORING DEVICE, AND MONITORING SYSTEM FOR MONITORING A STATE OF A CHROMATOGRAPHY APPARATUS

(71) Applicant: YOKOGAWA ELECTRIC CORPORATION, Tokyo (JP)

(72) Inventors: Riko Tsukamoto, Tokyo (JP); Takashi Inoue, Tokyo (JP)

(73) Assignee: YOKOGAWA ELECTRIC CORPORATION, Tokyo (JP)

(*) Notice: Subject to any disclaimer, the term of this patent is extended or adjusted under 35 U.S.C. 154(b) by 496 days.

(21) Appl. No.: 16/540,432

(22) Filed: Aug. 14, 2019

(65) Prior Publication Data

US 2020/0072804 A1    Mar. 5, 2020

(30) Foreign Application Priority Data

Aug. 28, 2018  (JP) .............................. JP2018-159088

(51) Int. Cl.
*G01N 30/88* (2006.01)
*G01N 30/02* (2006.01)

(52) U.S. Cl.
CPC ....... *G01N 30/88* (2013.01); *G01N 2030/025* (2013.01); *G01N 2030/889* (2013.01)

(58) Field of Classification Search
CPC .............................. G01N 30/88; G01N 30/86
See application file for complete search history.

(56) References Cited

U.S. PATENT DOCUMENTS

| | | | | |
|---|---|---|---|---|
| 4,888,295 | A * | 12/1989 | Zaromb | G01N 33/0031 73/61.52 |
| 9,638,677 | B2 * | 5/2017 | Kobayashi | H01J 49/0031 |
| 10,613,063 | B2 * | 4/2020 | Mao | G01N 30/8617 |
| 2016/0209378 | A1 | 7/2016 | Kobayashi et al. | |
| 2018/0113101 | A1 | 4/2018 | Mao et al. | |

FOREIGN PATENT DOCUMENTS

| | | |
|---|---|---|
| JP | H08-145975 A | 6/1996 |
| JP | 2002-317176 A | 10/2002 |
| JP | 2006317176 A | 11/2006 |
| JP | 2011518314 A | 6/2011 |
| WO | 2009094203 A2 | 7/2009 |
| WO | 2018/122191 A1 | 7/2018 |

* cited by examiner

*Primary Examiner* — Bryan Bui
(74) *Attorney, Agent, or Firm* — Osha Bergman Watanabe & Burton LLP

(57) ABSTRACT

A non-transitory computer readable medium (CRM) storing computer readable program code for monitoring a state of a chromatography apparatus embodied therein that: receives one or more monitoring conditions that each include a determination condition for parameters related to measurements taken using the chromatography apparatus; and displays, in parallel and using a combination operational expression: a first conditional expression based on at least one of the monitoring conditions that make up a first combined conditional expression, wherein the first combined conditional expression is based on a first combined monitoring condition that combines all of the received monitoring conditions, and a second conditional expression based on at least one of the monitoring conditions associated with the first conditional expression.

18 Claims, 12 Drawing Sheets

| No. | Condition 1 | AND / OR | Condition 2 | Comments |
|---|---|---|---|---|
| C1 | P1-1. Holding time<30 | AND | P1-1. Density>0.11 | P1-1 abnormality |
| C2 | P1-2. Holding time<60 | AND | P1-2. Density>0.12 | P1-2 abnormality |
| C3 | P2-1. Holding time<90 | AND | P2-1. Density>0.13 | P2-1 abnormality |
| C4 | P2-2. Holding time<120 | AND | P2-2. Density>0.14 | P2-2 abnormality |
| C5 | C1 | OR | C2 | Column deterioration |
| C6 | C3 | OR | C4 | Carrier pressure temporary increase |
| C7 | C5 | AND | NOT C6 | Column deterioration, replace column |
| C8 | ... | ... | ... | ... |
| C9 | ... | ... | ... | ... |
| C10 | ... | ... | ... | ... |

| Combined Monitoring Conditions | | | | | | |
|---|---|---|---|---|---|---|
| Analyzer ID | 1 ▶ | | | ToCSV | | Edit |
| No. | Condition 1 | AND/... | Condition 2 | AND/... | | Comments |
| ☐ C1 | Peak: 1-1. Holding time (lower limit)<... | AND | Peak: 1-1. Density (upper limit)>=0.110 | AND | | P1-1  Abnormality |
| ☐ C2 | Peak: 1-2. Holding time (lower limit)<... | AND | Peak: 1-2. Density (upper limit)>=0.120 | AND | | P1-2  Abnormality |
| ☐ C3 | Peak: 2-1. Holding time (lower limit)<... | AND | Peak: 2-1. Density (upper limit)>=0.130 | AND | | P2-1  Abnormality |
| ☐ C4 | Peak: 2-2. Holding time (lower limit)<... | AND | Peak: 2-2. Density (upper limit)>=0.140 | AND | | P2-2  Abnormality |
| ☐ C5 | C1 | OR | C2 | | | Column degradation |
| ☐ C6 | C3 | OR | C4 | | | Temporary increase of carrier gas |
| ☑ C7 | C5 | AND | C6 | | | Gas chromatography of Tag No. AT-1439A |
| ☐ C8 | | | | | | |
| ☐ C9 | | | | | | |
| ☐ C... | | | | | | |
| ☐ C... | | | | | | |
| ☐ C... | | | | | | |
| ☐ C... | | | | | | |
| ☐ C... | | | | | | |
| ☐ C... | | | | | | |

Close

FIG. 8

| No | Conditional Expression | Comments |
|---|---|---|
| C1 | (((P1-1.Holding time<30)AND(P1-1.Density>0.11)OR((P1-2.Holding time<60)AND(P1-2.Density>0.12))) AND NOT (((P2-1.Holding time<90)AND(P2-1.Density>0.13))OR((P2-2.Holding time<120)AND(P2-2.Density>0.14))) | Column degradation replace column |
| C2 | ... | ... |
| C3 | ... | ... |
| C4 | ... | ... |
| C5 | ... | ... |
| C6 | ... | ... |
| C7 | ... | ... |
| C8 | ... | ... |
| C9 | ... | ... |
| C10 | ... | ... |

FIG. 9

PROIR ART

MONITORING METHOD, MONITORING DEVICE, AND MONITORING SYSTEM FOR MONITORING A STATE OF A CHROMATOGRAPHY APPARATUS

TECHNICAL FIELD

The present invention relates to a monitoring method, a monitoring device, and a monitoring system for monitoring a state of a chromatography apparatus.

BACKGROUND

Art relating to a monitoring system for monitoring the state of a chromatography apparatus used in chemical analysis is conventionally known.

For example, patent document 1 discloses an automated system for stopping a chromatography process when a plurality of performance parameters based on a plurality of process values generated using a detector are not within a specific range.

PATENT DOCUMENTS

[Patent Document 1] JP 2011-518314 A

When monitoring the state of a chromatography apparatus, a plurality of states establishing a single monitoring condition are considered, and generally the state of a chromatography apparatus cannot be specified only by establishing a single monitoring condition. In such a case, it is necessary for the user to combine a plurality of single monitoring conditions to specify the state of the chromatography apparatus. Conventionally, the user grasps such a combination to specify the state of the chromatography apparatus. However, in such a case, when the combination of monitoring conditions becomes complex, it is difficult to grasp the details.

SUMMARY

One or more embodiments provide a monitoring method, a monitoring device, and a monitoring system for monitoring a state of a chromatography apparatus wherein details of the monitoring conditions can be easily grasped, even when combining a plurality of monitoring conditions.

A monitoring program according to several embodiments is a monitoring program for monitoring the state of a chromatography apparatus, including: an input step for receiving input of a single monitoring condition including determination conditions for parameters relating to the measurements taken using the chromatography apparatus, or input of combined monitoring conditions combining a plurality of the single monitoring conditions; and a display step for displaying in parallel a first conditional expression based on at least one of the single monitoring conditions, constituting a portion of a first combined conditional expression based on a first combined monitoring condition combining all inputted monitoring conditions, and a second conditional expression based on at least one of the single monitoring conditions, associated with the first conditional expression by a combination operational expression. Thus, even if the user does not grasp the combination of measurement data necessary for estimation, the user can easily identify the state of the chromatography apparatus. In other words, even when combining a plurality of monitoring conditions, the user can easily grasp the details of the monitoring conditions, and user convenience improves.

The monitoring program according to one or more embodiments may further include a determination step for determining the first combined conditional expression based on the first combined monitoring conditions combining all inputted monitoring conditions. Thus, the user can, for example input only a simple single monitoring condition, without inputting a complex first combined monitoring condition. Therefore, input settings of the monitoring conditions are simplified, and user convenience improves.

The monitoring program of one or more embodiments may display, in the display step, two portions of the first combined conditional expressions in two columns respectively and arrange the first conditional expression and the second conditional expression in the same row, the first and second conditional expression being mutually associated by the combined operation expression. Thus, even with a small screen and a limited display region and the like, it is possible to provide a display wherein the user can easily grasp the conditional expression. In other words, user visibility improves.

The monitoring program according to one or more embodiments may, in the input step, receive input of comments relating to the second combined monitoring conditions based on the second combined expression configured by the first conditional expression, the combined operational expression, and the second conditional expression, and further display the comment arranged in the same row as the first conditional expression and the second conditional expression in the display step. Thus, the user can easily grasp the effect of the combined monitoring conditions of column degradation and the like. Furthermore, even if there is no abnormality in a column, the user can grasp the state of other positions and the possibility of an abnormality appearing in those positions. Grasping these enables the user to rapidly perform accurate maintenance work.

The monitoring program according to one or more embodiments may further include a receiving step for receiving information of parameters relating to the measurements taken using the chromatography apparatus from the chromatography apparatus; a determining step to determine at least one of whether a second combined monitoring condition based on the second combined conditional expression configured by the first conditional expression, the combined operational expression, and the second conditional expression based on information of parameters relating to the received measurements is established, and whether the first combined monitoring condition is established; and a notification step to notify that corresponding conditions are established based on the established determination of the determining step. Thus, making a determination using combined monitoring conditions combining a plurality of single monitoring conditions enables monitoring of the state of a chromatography apparatus that could not be grasped by only a single monitoring condition. Furthermore, a notification from the notification step enables the user to more intuitively grasp whether each conditional expression is established.

For the monitoring program of one or more embodiments, the parameters relating to the measurements taken using the chromatography apparatus may include: an operation parameter of each constituent part that configures the measurement system for measurements taken using a process gas chromatography apparatus; and an analysis parameter for measurement results obtained by measurements taken using the process gas chromatography apparatus.

The monitoring device according to one or more embodiments is a monitoring device for monitoring the state of a chromatography apparatus, provided with: a control part; an input part for receiving input of a single monitoring condition including determination conditions for parameters relating to measurements taken using the chromatography apparatus, or input from combined monitoring conditions combining a plurality of the single monitoring conditions, and a display part for displaying in parallel a first conditional expression based on at least one of the single monitoring conditions, constituting a portion of a first combined conditional expression based on a first combined monitoring condition combining all inputted monitoring conditions, and a second conditional expression based on at least one of the single monitoring conditions, associated with the first conditional expression by a combination operational expression. Thus, even if the user does not grasp the combination of measurement data necessary for estimation, the user can easily identify the state of the chromatography apparatus. In other words, even when combining a plurality of monitoring conditions, the user can easily grasp the details of the monitoring conditions, and user convenience improves.

For the monitoring device according to one or more embodiments, the control part may determine the first combined conditional expression based on the first combined monitoring condition combining all inputted monitoring conditions. Thus, the user can, for example input only a simple single monitoring condition without inputting a complex first combined monitoring condition. Therefore, input settings of the monitoring conditions are simplified, and user convenience improves.

For the monitoring device according to one or more embodiments, the display part may display two portions of the first combined conditional expressions in two columns respectively and arrange the first conditional expression and the second conditional expression in the same row, the first conditional expression and the second conditional expression being mutually associated by the combined operational expression. Thus, even with a small screen and a limited display region and the like, it is possible to provide a display wherein the user can easily grasp the conditional expression. In other words, user visibility improves.

For the monitoring device according to one or more embodiments, the input part may receive input of comments relating to the second combined monitoring conditions based on the second conditional expression configured by the first conditional expression, the combined operational expression, and the second conditional expression, and the display part may further display the comment arranged in the same row as the first conditional expression and the second conditional expression. Thus, the user can easily grasp the effect of the combined monitoring conditions of column degradation and the like. Furthermore, even if there is no abnormality in a column, the user can grasp the state of other positions and the possibility of an abnormality appearing in those positions. Grasping these enables the user to rapidly perform accurate maintenance work.

The monitoring device according to one or more embodiments may further be provided with a communication part and a notification part, wherein the communication part may receive information of a parameter relating to the measurements taken using the chromatography apparatus from the chromatography apparatus, the control part may determine at least one of whether a second combined monitoring condition based on the second combined conditional expression configured by the first conditional expression, the combined operational expression, and the second conditional expression based on the information of a parameter relating to the received measurements is established, and whether the first combined monitoring condition is established; the notification part may notify that a corresponding condition is established based on an establishment determination according to the control part. Thus, making a determination using combined monitoring conditions combining a plurality of single monitoring conditions enables monitoring of the state of a chromatography apparatus that could not be grasped by only a single monitoring condition. Furthermore, the notification from the notification part enables the user to more intuitively grasp whether each conditional expression is established.

The monitoring system according to one or more embodiments is a monitoring system provided with any of the above monitoring devices and a process gas chromatography apparatus, wherein the parameters relating to the measurements taken using the chromatography apparatus may include: operation parameters of each constituent part that configures the measurement system for measurements taken using the process gas chromatography apparatus, and analysis parameters for the measurement results obtained by the measurements taken using the process gas chromatography apparatus.

According to one or more embodiments of the present invention, a monitoring method, a monitoring device, and a monitoring system for monitoring a state of a chromatography apparatus can be provided in which the details of monitoring conditions can be easily grasped even when combining a plurality of monitoring conditions.

BRIEF DESCRIPTION OF THE DRAWINGS

FIG. 5 shows a schematic diagram illustrating an example of a display screen when the monitoring apparatus of FIG. 1 displays details of the first combined monitoring condition with a conditional expression.

FIG. 7 shows a schematic diagram illustrating a second example of a notification to the user performed by the notification part of FIG. 1.

FIG. 8 shows a schematic diagram illustrating a third example of a notification to the user performed by the notification part of FIG. 1.

FIG. 9 shows a schematic diagram illustrating, as an example, the screen when each conditional expression of FIG. 5 is disposed in a line.

DETAILED DESCRIPTION

Figure 10:
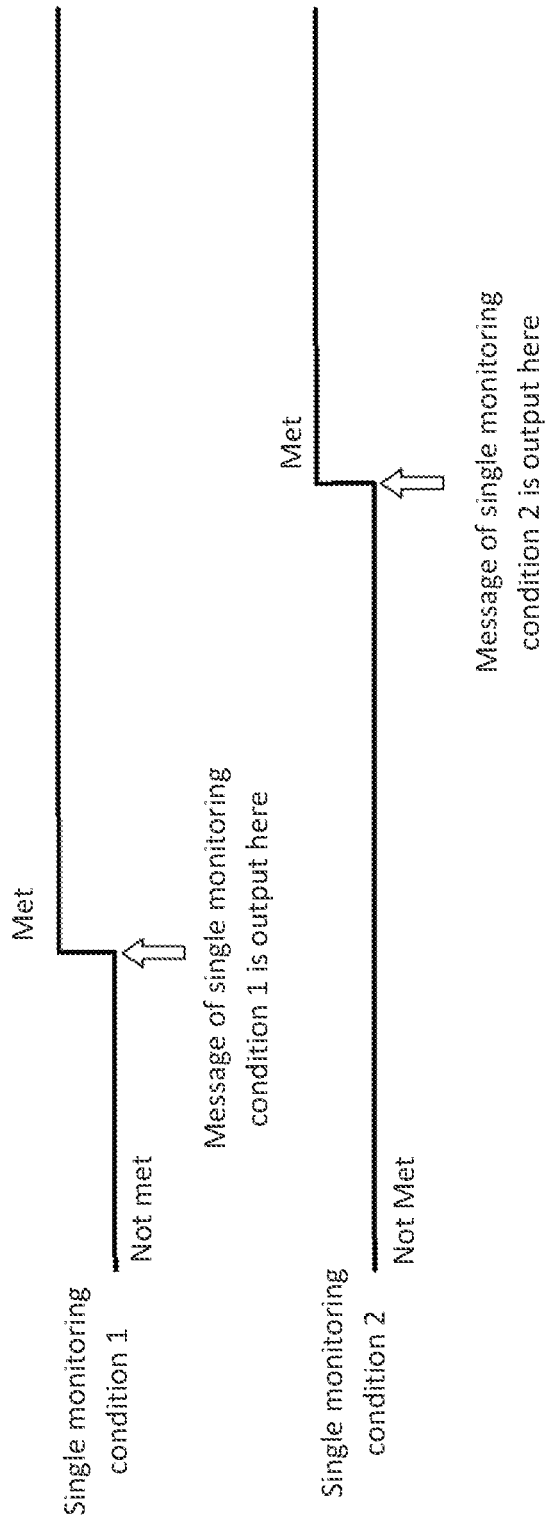
FIG. 10 shows a schematic diagram illustrating a conventional monitoring method for monitoring the state of a chromatography apparatus.
Figure 11:
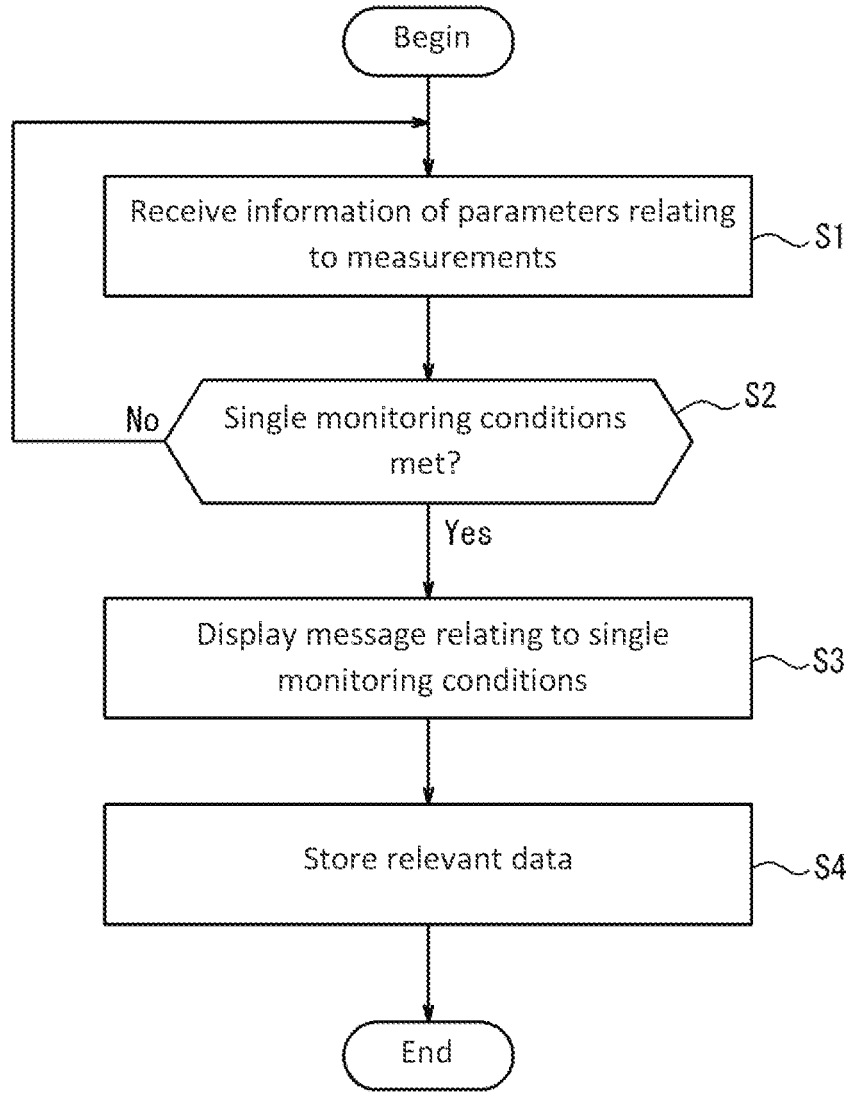
FIG. 11 shows a flow-chart illustrating the flow of a conventional monitoring method for monitoring the state of a chromatography apparatus.

The details of the conventional art will mainly be described while referencing FIG. 10 and FIG. 11.

FIG. 10 shows a schematic diagram illustrating a conventional monitoring method for monitoring the state of a chromatography apparatus. The monitoring operation of a monitoring device executing a conventional monitoring method for monitoring a state of a chromatography device will mainly be described while referencing FIG. 10.

In a conventional monitoring method, notification to the user for parameters relating to measurements taken using the chromatography apparatus is performed each time a pre-set individual monitoring condition is met. That is, monitoring conditions each function independently.

More specifically, when a single monitoring condition 1 is met, the monitoring device displays that the single monitoring condition 1 is met, comment details associated with the single monitoring condition 1, and the like as a message. Thereafter, when a single monitoring condition 2 is met, the monitoring device also displays at this point in time that the single monitoring condition 2 is met, comment details associated with the single monitoring condition 2, and the like as a message.

FIG. 11 shows a flow-chart illustrating the flow of a conventional monitoring method for monitoring the status of a chromatography apparatus.

When referencing FIG. 11, in step S1, the monitoring device receives information of parameters relating to measurements taken using the chromatography apparatus from the chromatography apparatus.

In step S2, the monitoring device determines whether a single monitoring condition is met. When the monitoring device determines that a single monitoring condition is met, the flow proceeds to step S3. When the monitoring device determines that a single monitoring condition is not met, the flow returns to step S1.

In step S3, when the monitoring device determines that a single monitoring condition is met, it displays a message relating to the met single monitoring condition.

In step S4, the monitoring device stores related data.

In such conventional art, the user can only directly grasp the fulfillment or non-fulfillment of the single monitoring condition. When a single monitoring condition is met, there are cases where the user can decide the success or failure of a specific state of the chromatography apparatus, but multiple such states wherein a condition is met are conceivable simply by a single monitoring condition being met, and generally the state of the chromatography apparatus cannot be identified.

In such a case, the user must combine a plurality of single monitoring conditions to identify the state of the chromatography apparatus. That is, the user must presume the state of the chromatography apparatus by a comprehensive decision from the states of individual monitoring conditions. Accordingly, even if monitoring conditions are met individually, it is not easy to grasp the system state of the chromatography apparatus.

For example, deterioration of a column and abnormality of a sampling apparatus are serious malfunctions for a chromatography apparatus. However, it is difficult to directly install sensors to monitor these events. Conventionally, the user presumes these events based on a plurality of data measured by the chromatography apparatus. When the user is an experienced expert, they grasp the combination of measurement data necessary for presumption, and such a presumption is also possible. However, when the user is an inexperienced beginner, such a presumption is difficult.

One or more embodiments of the present invention provide a monitoring program, monitoring device, and monitoring system wherein details of the monitoring conditions can be easily grasped, even when combining a plurality of monitoring conditions.

Below, embodiments of the present invention will be described while referencing the attached drawings.

Figure 1:
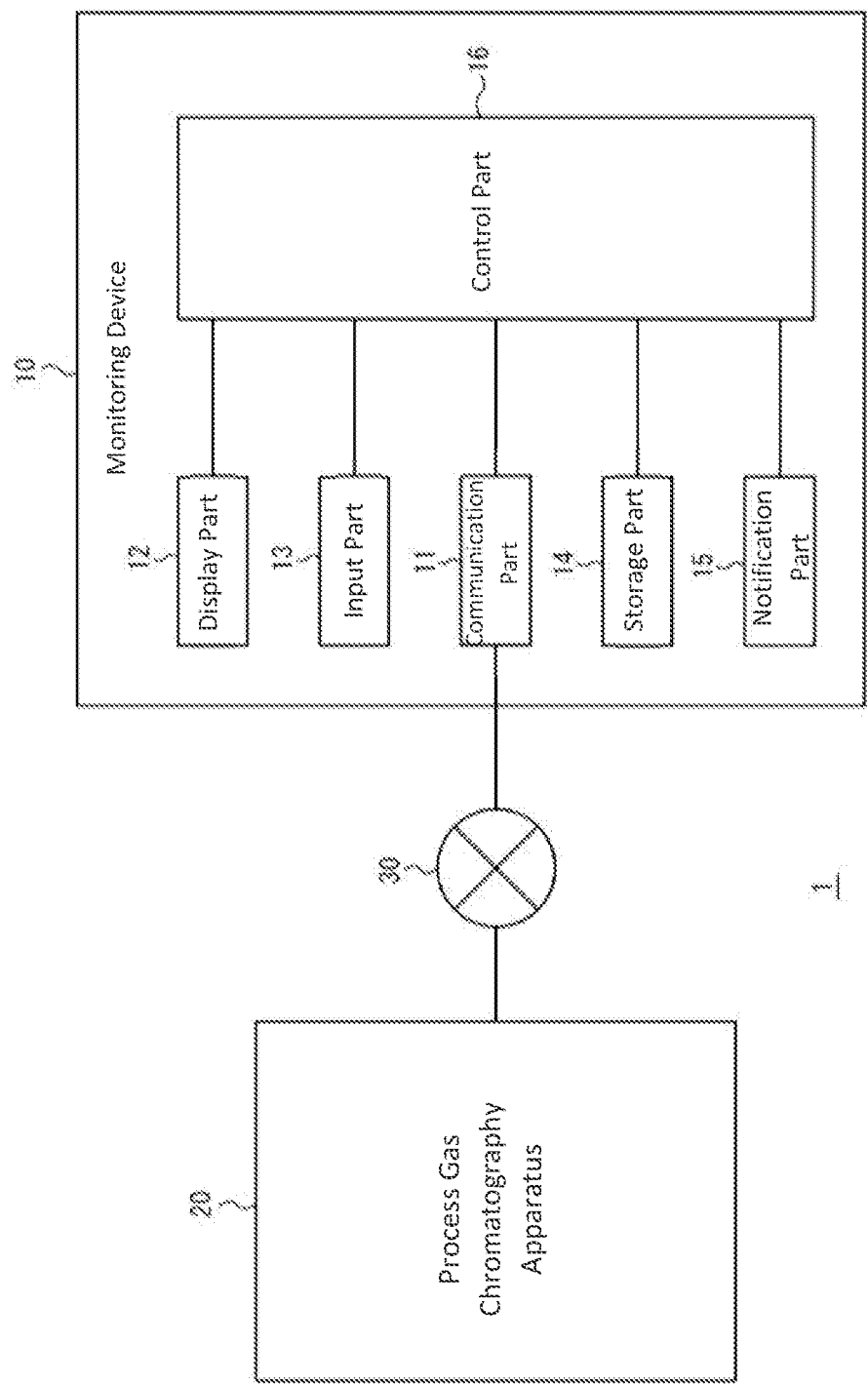
FIG. 1 shows a block diagram illustrating an example of a monitoring system including a monitoring apparatus according to one or more embodiments.

FIG. 1 shows a block diagram illustrating an example of a monitoring system 1 including a monitoring device 10 according to one or more embodiments. As illustrated in FIG. 1, a monitoring system 1 has, for example, a monitoring device 10 and a process gas chromatography apparatus 20 connected to the monitoring device 10 via a network 30.

In the following description, "parameters relating to measurement" include operation parameters of each constituent part constituting a measurement system in measurements taken using the process gas chromatography apparatus 20, and analysis parameters for measurement results obtained by measurements taken using the process gas chromatography apparatus 20.

"Operation parameters" include a number of times an oven bulb for creating a path for a sample is operated, a number of times a flow path valve for deciding a measurement flow path and sample amount is operated, a number of times an atmospheric pressure balance valve for temporarily stopping a sample upstream of the process gas chromatography apparatus 20 is operated to reduce the sample pressure to atmospheric pressure when sampling a process sample of a gas, and the like. In addition, "operation parameters" include an operating time of a vortex tube, which is an apparatus for cooling, an operating time of a detector for measuring component concentration of a sample gas, an electrical current value, and the like.

"Analysis parameters" include component concentration, holding time, tailing factor, component resolution, base level when gate is on, noise level when gate is on, base level when component is on, S/N ratio of components, and the like in measurement results from the process gas chromatography apparatus 20. Holding time means, for example, the time from pouring a sample into a column of the process gas chromatography apparatus 20 until each component is detected by the detector. In the same column of the process gas chromatography apparatus 20, each component is detected at the same time of each measurement in analysis under fixed conditions. Accordingly, it is possible to identify each component from the holding time corresponding to one or more detected peaks, and the holding time is beneficial information in identification of components corresponding to peaks.

"Single monitoring conditions" include determination conditions for parameters relating to one measurement. "Combined monitoring conditions" include monitoring conditions combining a plurality of single monitoring conditions. "First combined monitoring condition" includes combined monitoring conditions combining all inputted monitoring conditions.

The network 30 includes any network wherein the monitoring device 10 and the process gas chromatography 20 can mutually communicate and connect. For example, the network 30 includes any network such as internet or a local area network. The network 30 may be configured wirelessly, wired, or by any combination thereof.

The monitoring device 10 includes any information processing device having a function of monitoring the process gas chromatography apparatus 20. The monitoring device 10 may be a dedicated information processing device specialized for the configuration of the monitoring system 1, and it may be any general use electronic device such as a mobile phone, smartphone, tablet computer, desktop computer, or mobile computer.

The monitoring device 10 has a communication part 11 (a communication circuit), a display part 12 (a display), and input part 13 (an input), a memory part 14 (a memory), a notification part 15, and a control part 16 (a processor).

The communication part 11 includes any communication interface supporting any communication protocol. The communication part 11 can communicate and connect with the process gas chromatography apparatus 20 via the network 30. The communication part 11 receives information of parameters relating to measurement from the process gas chromatography apparatus 20 via the network 30. The communication part 11 outputs the obtained information of parameters relating to measurement to the control part 16.

The display part 12 includes any output interface acting on the user's vision. The output interface constituting the display part 12 includes, for example, any display device, such as a liquid crystal display. The display part 12 may include, for example, a liquid crystal display provided integrally in a mobile computer. The display part 12 displays, for example, a settings screen wherein the user sets single monitoring conditions and combined monitoring conditions. The display part 12 displays, for example, single conditional expressions based on single monitoring conditions and combined conditional expressions based on combined monitoring conditions, such as illustrated in FIG. 5 described later.

The input part 13 includes any input interface, such as a microphone, to which various instructions are inputted by keyboard, mouse, touchpad, and voice. The input part 13 may, for example, be configured integrally with the liquid crystal display constituting the display part 12 as a touch panel. The input part 13 receives, for example, a plurality of inputs of single monitoring conditions from the user on the settings screen displayed on the display part 12. Furthermore, the input part 13 receives, for example, at least one input of a combined monitoring condition from the user on the settings screen displayed on the display part 12.

The memory part 14 includes any memory apparatus, such as HDD (hard disk drive), SSD (solid state drive), EEPROM (electrically erasable programmable read-only memory), ROM (read-only memory), and RAM (random access memory), and records information necessary to realize the monitoring operation of the monitoring system 1. The memory part 14 may function as a main memory apparatus, auxiliary memory apparatus, or cache memory. The memory part 14 is not limited to being stored in the monitoring device 10, and it may be an external memory apparatus connected by a digital input and output port or the like such as USB.

The notification part 15 includes, for example, any output interface capable of notifying the user that a combined monitoring condition is met. The notification part 15 may include, for example, an output interface constituting the display part 12, and it may include a voice output interface such as a speaker. The notification part 15 may notify, for example, by a visual method by images, letters, display or luminescence of colors, or the like, by an auditory method by an alarm sound, a voice by a voice guide, or the like, or by a combination thereof. The notification performed by the notification part 15 is not limited to a visual or auditory method, and it may include any method wherein a user can recognize that a combined monitoring condition is met. For example, the notification part 15 may notify the user by a vibration pattern or the like.

The control part 16 includes one or more processors. More specifically, the control part 16 includes any processor, such as a general use processer and a dedicated processor specialized for specific processing. The control part 16 may include, for example, a processor installed in any general electronic device such as a mobile phone, smartphone, tablet computer, desktop computer, or mobile computer, and a processor installed in a dedicated information processing device specialized for the configuration of the monitoring system 1.

Figure 2:
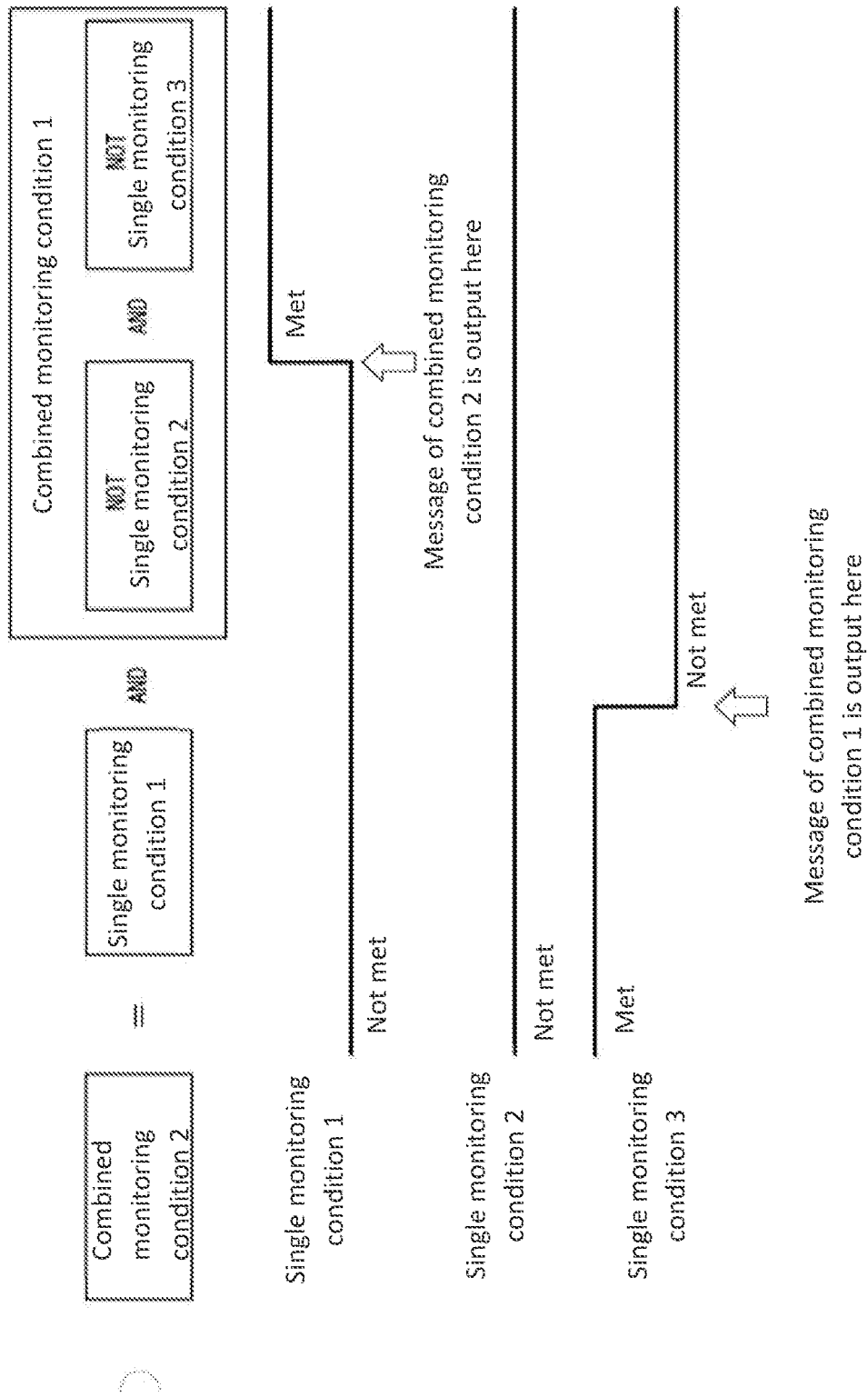
FIG. 2 shows a schematic diagram conceptually illustrating a monitoring operation performed by the monitoring apparatus of FIG. 1.

FIG. 2 shows a schematic diagram conceptually illustrating the monitoring operation performed by the monitoring device 10 of FIG. 1. Differences with the conventional monitoring method of FIG. 10 will mainly be described while referencing FIG. 2.

In the monitoring device 10 according to one or more embodiments, when the control part 16 determines that a pre-set combined monitoring condition for the parameters relating to measurement is met, it controls the notification part 15 to notify the user. That is, even when single monitoring conditions are each independently met, the control part 16 does not cause the notification part 15 to notify the user.

More specifically, the control part 16 determines that the combined monitoring condition 1 is met from the fact that a single monitoring condition 3 has changed from a met state to unmet and that the single monitoring condition 2 is similarly unmet. At this stage, the control part 16 may cause the notification part 15 to notify as a message that the combined monitoring condition 1 is met, comment details associated with the combined monitoring condition 1, and the like. Additionally, when the combined monitoring condition 1 is in a met state, and the single monitoring condition 1 is similarly met, the control part 16 determines that the combined monitoring condition 2 is met. At this stage also, the control part 16 may cause the notification part 15 to notify as a message that the combined monitoring condition 2 is met, comment details associated with the combined monitoring condition 2, and the like.

An example of the monitoring operation performed by the monitoring device 10 according to one or more embodiments will be described in more detail while referencing FIG. 3A, FIG. 3B, and FIG. 4.

Figure 3A:
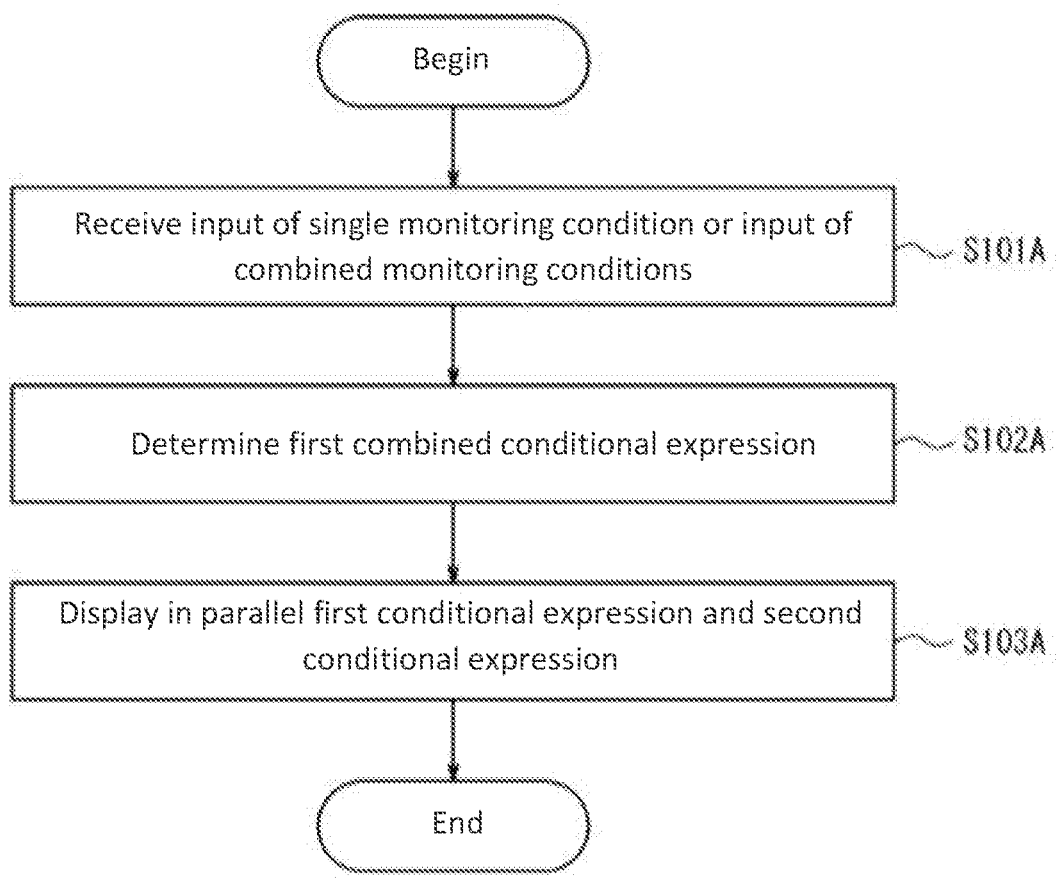
FIG. 3A shows a flow-chart illustrating a first example of the monitoring operation performed by the monitoring apparatus of FIG. 1.

FIG. 3A shows a flow-chart illustrating a first example of the monitoring operation performed by the monitoring device 10 of FIG. 1. The flow-chart of FIG. 3A illustrates the flow from the input part 13 receiving input of a single monitoring condition or combined monitoring condition to the display part 12 displaying the input details.

When referencing FIG. 3A, in step S101A, the control part 16 controls the input part 13 to receive input of single monitoring conditions or input of combined monitoring conditions by the user.

In step S102A, the control part 16 decides a first combined conditional expression based on a first combined monitoring condition combining all inputted monitoring conditions.

In step S103A, the control part 16 controls the display part 12 to display in parallel a first conditional expression based on at least one single monitoring condition, constituting a portion of the decided first combined conditional expression, and a second conditional expression based on at least one single monitoring condition, associated with the first conditional expression by a combination operational expression.

Here, when applying to the example of FIG. 2, the first combined monitoring condition corresponds to the combined monitoring condition 2. When the at least one single monitoring condition based on the first conditional expression corresponds to the one single monitoring condition 1, the at least one single monitoring condition based on the second conditional expression corresponds to the two of the NOT single monitoring condition 2 and the NOT single monitoring condition 3, that is, the combined monitoring condition 1. When the at least one single monitoring condition based on the first conditional expression corresponds to one NOT single monitoring condition 2, the at least one single monitoring condition based on the second conditional expression corresponds to one NOT single monitoring condition 3. In FIG. 2, only AND is illustrated as the combination operational expression mutually associating the first conditional expression and the second conditional expression, but the combination operational expression may be any operational expression. For example, the combination operation expression may be OR.

Figure 3B:
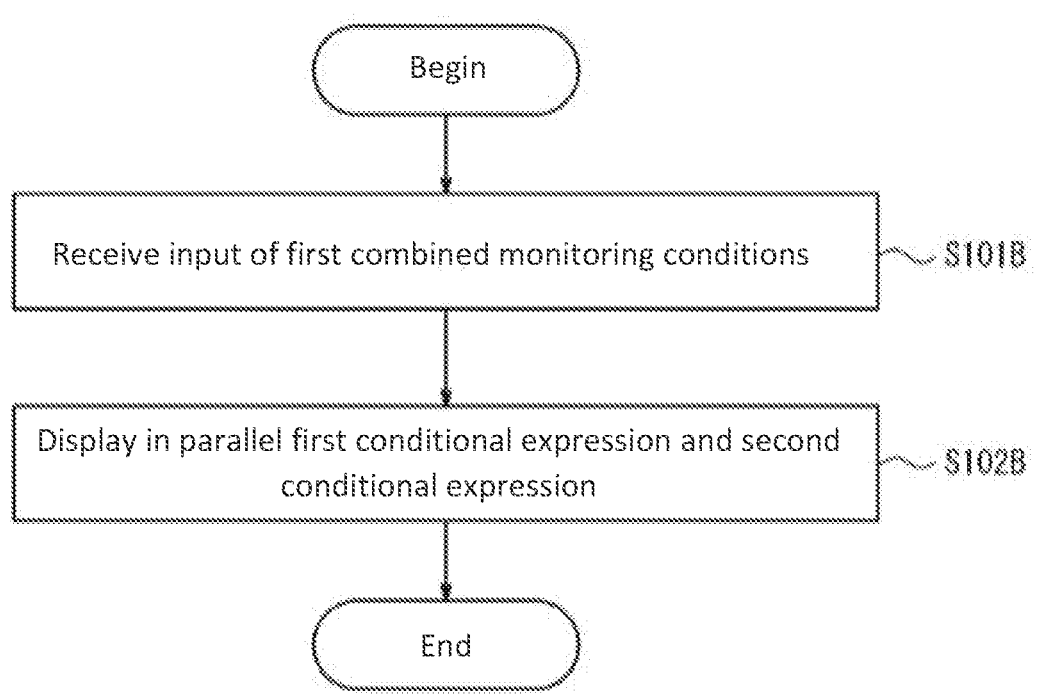
FIG. 3B shows a flow-chart illustrating a second example of the monitoring operation performed by the monitoring apparatus of FIG. 1.

FIG. 3B shows a flow-chart illustrating a second example of the monitoring operation performed by the monitoring device 10 of FIG. 1. The flow-chart of FIG. 3B illustrates the flow from the input part 13 receiving input of the first combined monitoring condition decided by the user to the display part 12 displaying the input details.

When referencing FIG. 3B, in step S101B, the control part 16 controls the input part 13 to receive input of the first combined monitoring condition by the user.

In step S102B, the control part 16 controls the display part 12 to display in parallel the first conditional expression based on at least one single monitoring condition, constituting a portion of the first combined conditional expression based on the first combined monitoring condition, and the second conditional expression based on at least one single monitoring condition, associated with the first conditional expression by a combination operational expression.

Figure 4:
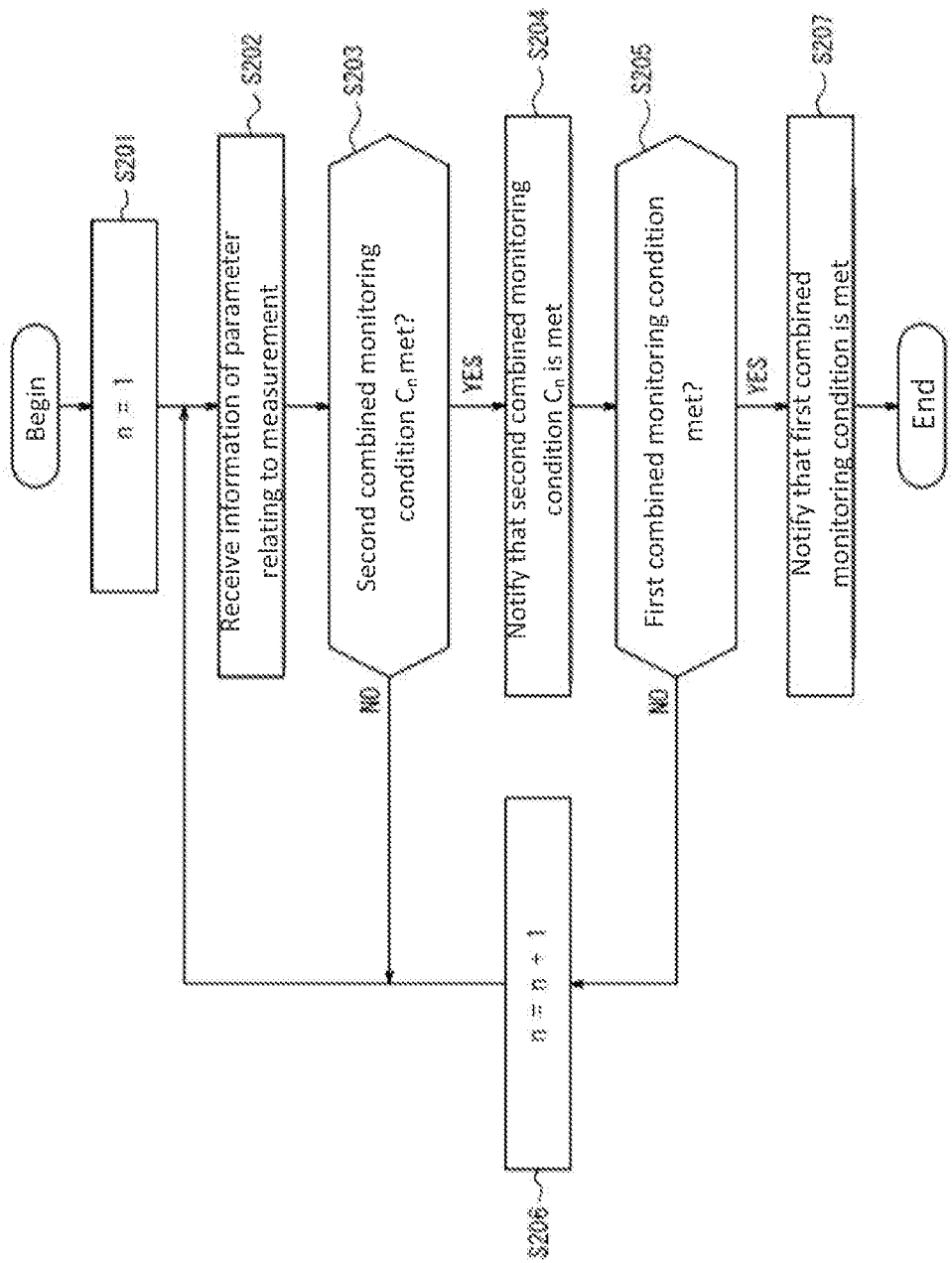
FIG. 4 shows a flow-chart illustrating a third example of the monitoring operation performed by the monitoring apparatus of FIG. 1.

FIG. 4 shows a flow-chart illustrating a third example of the monitoring operation performed by the monitoring device 10 of FIG. 1. The flow-chart of FIG. 4 illustrates the flow from the communication part 11 receiving information of parameters relating to measurement to the notification part 15 notifying the user that the first combined monitoring condition is met.

When referencing FIG. 4, in step S201, the control part 16 sets the value of a number n to 1.

In step S202, the control part 16 controls the communication part 11 to receive information of parameters relating to measurement from the process gas chromatography apparatus 20.

In step S203, the control part 16 determines whether a single monitoring condition is met based on the received the information of parameters relating to measurement. Then, the control part 16 determines whether an nth second combined monitoring condition $C_n$ is met. When the control part 16 determines that the second combined monitoring condition $C_n$ is met, the flow proceeds to step S204. When the control part 16 determines that the second combined monitoring condition $C_n$ is not met, the flow returns to step S202.

Here, "second combined monitoring condition" includes a combined monitoring condition based on the second combined conditional expression configured by the first conditional expression, the combination operational expression, and the second conditional expression. When applying to the example of FIG. 2, the second combined monitoring condition corresponds, for example, to the combined monitoring condition 1 when the single monitoring condition based on the first conditional expression corresponds to the NOT single monitoring condition 2 and the single monitoring condition based on the second conditional expression corresponds to the NOT single monitoring condition 3.

In step S204, the control part 16 controls the notification part 15 to notify that the second combined monitoring condition $C_n$ is met.

In step S205, the control part 16 determines whether the first combined monitoring condition based on the information of parameters relating to the received measurement is met. When the control part 16 determines that the first combined monitoring condition is met, the flow proceeds to step S207. When the control part 16 determines that the first combined monitoring condition is not met, the flow returns to step S202 via step S206.

In step S206, the control part 16 increments the value of the number n of the second combined monitoring condition $C_n$. That is, the control part 16 begins determination of the success or failure of the n+1th second combined monitoring condition $C_{n+1}$.

In step S207, the control part 16 controls the notification part 15 to notify that the first combined monitoring condition is met.

FIG. 5 shows a schematic diagram illustrating an example of a display screen when the monitoring device 10 of FIG. 1 displays details of the first combined monitoring condition with a conditional expression.

When referencing FIG. 5, the display part 12 displays in parallel the first conditional expression constituting a portion of the first combined conditional expression decided by the control part 16 or the user and the second conditional expression associated with the first conditional expression by the combination operational expression. The display part 12 displays two portions of the first combined conditional expression in parallel respectively in two columns and displays in the same row the first conditional expression and the second conditional expression mutually associated by the combination operational expression.

For example, in the example illustrated in FIG. 5, the display part 12 displays each second combined conditional expression based on the second combined monitoring condition $C_n$, for which n has a value of 1 to 7, arranged vertically in order in each row. The display part 12 displays the first conditional expression constituting a portion of each second combined conditional expression in a condition 1 column of each row. The display part 12 displays the second conditional expression constituting a portion of each second combined conditional expression in a condition 2 column of each row. The display part 12 displays the combination conditional expression including AND, OR, and the like mutually associating the first conditional expression and the second conditional expression between the first conditional expression and the second conditional expression in each row.

When the input part 13 receives input of a comment relating to the second combined monitoring condition $C_n$, the display part 12 further displays the comment in parallel in the same row as the first conditional expression and second conditional expression corresponding to the second combined monitoring condition $C_n$. For example, in the example illustrated in FIG. 5, the display part 12 displays comments relating to the second combined monitoring condition $C_n$ on the right next to the second conditional expression in each row. For example, the display part 12 displays the state of the process gas chromatography apparatus 20 corresponding to each second combined monitoring condition $C_n$, based on each comment.

The first combined monitoring condition illustrated in FIG. 5 is a condition for detecting deterioration of a column used in the process gas chromatography apparatus 20. In such column deterioration, a characteristic that holding time becomes shorter because of the column deterioration is known. Thus, it is detected whether the holding time becomes shorter than a threshold.

Three conditions are considered here. When component concentration is essentially 0%, due to the high probability that column deterioration will be falsely detected, a first condition is a condition of invalidating holding time data relating to component concentrations of essentially 0%. For a second condition, since diagnosis is difficult when attempting to detect column deterioration of only one component that is essentially 0%, detecting column deterioration by a combination of a plurality of components becomes a condition. A third condition is a condition of also determining holding time of components in the target column and other columns since factors shortening holding time are not only column deterioration but could also occur due to a temporary increase in carrier pressure. A temporary increase in carrier pressure shortens holding time in columns other than the target column as well. Accordingly, detecting such a phenomenon enables removal of the temporary increase in carrier pressure from the causes of shortening of holding time. A temporary increase in carrier pressure may momentarily occur, for example, when a carrier is using industrial nitrogen $N_2$ or the like, or due to other operation conditions. Additionally, a temporary increase in carrier pressure may also occur when a carrier decompression valve is damaged.

Here, "P1-1" described in FIG. 5 means a component 1 of a column 1. "P1-2" means a component 2 of the column 1. "P2-1" means a component 1 of a column 2. "P2-2" means a component 2 of the column 2.

In the second combined monitoring condition $C_1$, the first conditional expression "P1-1. Holding time<30" based on the one single monitoring condition that the holding time of P1-1 is shorter than 30 seconds, and the second conditional expression "P1-1. Concentration>0.11" based on the one single monitoring condition that the concentration of P1-1 is larger than 0.11 vol % are associated by the combination operational expression "AND." In such a state, the display part 12 displays in parallel the first conditional expression "P1-1. Holding time<30" and the second conditional expression "P1-1. Concentration>0.11" in two columns in the same row.

In the second combined monitoring condition $C_1$, in addition to the first conditional expression showing that holding time becomes shorter than a threshold, the second conditional expression relating to the first condition above is included. That is, fulfillment of the second conditional expression means that a prescribed component concentration or greater is obtained for P1-1, and it is not necessary to invalidate holding time data. When the second combined monitoring condition $C_1$ is met, the display part 12 displays in parallel a comment of "P1-1 abnormality" showing that some abnormality has occurred for P1-1 in the row of the second combined monitoring condition $C_1$.

In the second combined monitoring condition $C_2$, the first conditional expression "P1-2. Holding time<60" based on the one single monitoring condition that the holding time of P1-2 is shorter than 60 seconds, and the second conditional expression "P1-2. Concentration>0.12" based on the one single monitoring condition that the concentration of P1-2 is larger than 0.12 vol % are associated by the combination operational expression "AND." In such a state, the display part 12 displays in parallel the first conditional expression "P1-2. Holding time<60" and the second conditional expression "P1-2. Concentration>0.12" in two columns in the same row.

The second combined monitoring condition $C_2$ is a monitoring condition set to be combined with the second combined monitoring condition $C_1$ based on the second condition above. That is, the second combined monitoring condition $C_2$ is a monitoring condition set for a component 2 different from the component 1 relating to the second combined monitoring condition $C_1$ based on the second condition above. In the second combined monitoring condition $C_2$, in addition to the first conditional expression showing that holding time becomes shorter than a threshold, the second conditional expression relating to the first condition above is included. When the second combined monitoring condition $C_2$ is met, the display part 12 displays in parallel a comment of "P1-2 abnormality" showing that some abnormality has occurred for P1-2 in the row of the second combined monitoring condition $C_2$.

In the second combined monitoring condition $C_3$, the first conditional expression "P2-1. Holding time<90" based on the one single monitoring condition that the holding time of P2-1 is shorter than 90 seconds, and the second conditional expression "P2-1. Concentration>0.13" based on the one single monitoring condition that the concentration of P2-1 is larger than 0.13 vol % are associated by the combination operational expression "AND." In such a state, the display part 12 displays in parallel the first conditional expression "P2-1. Holding time<90" and the second conditional expression "P2-1. Concentration >0.13" in two columns in the same row.

The second combined monitoring condition $C_3$ is a monitoring condition set for a column 2 different from a column 1 associated with the second combined monitoring conditions $C_1$ and $C_2$ based on the third condition above. In the second combined monitoring condition $C_3$, in addition to the first conditional expression showing that holding time becomes shorter than a threshold, the second conditional expression relating to the first condition above is included. When the second combined monitoring condition $C_3$ is met, the display part 12 displays in parallel a comment of "P2-1 abnormality" showing that some abnormality has occurred for P2-1 in the row of the second combined monitoring condition $C_3$.

In the second combined monitoring condition $C_4$, the first conditional expression "P2-2. Holding time<120" based on the one single monitoring condition that the holding time of P2-2 is shorter than 120 seconds, and the second conditional expression "P2-2. Concentration>0.14" based on the one single monitoring condition that the concentration of P2-2 is larger than 0.14 vol % are associated by the combination operational expression "AND." In such a state, the display part 12 displays in parallel the first conditional expression "P2-2. Holding time<120" and the second conditional expression "P2-2. Concentration >0.14" in two columns in the same row.

The second combined monitoring condition $C_4$ is a monitoring condition set similarly to the second combined monitoring condition $C_3$ for the column 2 different from the column 1 associated with the second combined monitoring conditions $C_1$ and $C_2$, based on the third condition above. Furthermore, the second combined monitoring condition $C_4$ is a monitoring condition set to be combined with the second combined monitoring condition $C_3$ based on the second condition above. That is, the second combined monitoring condition $C_4$ is a monitoring condition set for a second component 2 different from the component 1 associated with the second combined monitoring condition $C_3$ based on the second condition above. In the second combined monitoring condition $C_4$, in addition to the first conditional expression showing that holding time becomes shorter than a threshold, the second conditional expression relating to the first condition above is included. When the second combined monitoring condition $C_4$ is met, the display part 12 displays in parallel a comment of "P2-2 abnormality" showing that some abnormality has occurred for P2-2 in the row of the second combined monitoring condition $C_4$.

In the second combined monitoring condition $C_5$, the first conditional expression "C1" based on two single monitoring conditions and the second conditional expression "C2" based on two single monitoring conditions are associated by the combination operational expressional "OR." In such a state, the display part 12 displays in parallel the first conditional expression "C1" and the second conditional expression "C2" in two columns in the same row.

The second combined monitoring condition $C_5$ is a monitoring condition combining the second combined monitoring condition $C_1$ and the second combined monitoring condition $C_2$ based on the second condition above. That is, the second combined monitoring condition $C_5$ is a monitoring condition set to be met accompanying the fulfillment of either the second combined monitoring condition $C_1$ or the second combined monitoring condition $C_2$ for the two different component 1 and component 2 based on the second condition above. When the second combined monitoring condition $C_5$ is met, the display part 12 displays in parallel a comment of "column deterioration" showing there is a possibility of column deterioration in the row of the second combined monitoring condition $C_5$.

In the second combined monitoring condition $C_6$, the first conditional expression "C3" based on two single monitoring conditions and the second conditional expression "C4" based on two single monitoring conditions are associated by the combination operational expressional "OR." In such a state, the display part 12 displays in parallel the first conditional expression "C3" and the second conditional expression "C4" in two columns in the same row.

The second combined monitoring condition $C_6$ is a monitoring condition set to be combined with the second combined monitoring condition $C_5$ based on the third condition above. That is, the second combined monitoring condition $C_5$ being met and the second combined monitoring condition $C_6$ being met means that the holding time for each of the two different column 1 and column 2 has become shorter, and a temporary increase in carrier pressure has occurred. When the second combined monitoring condition $C_5$ along with the second combined monitoring condition $C_6$ are met, the display part 12 displays in parallel a comment of "carrier pressure temporary increase" showing there is a possibility a temporary increase in carrier pressure has occurred in the row of the second combined monitoring condition $C_6$.

In the second combined monitoring condition $C_7$, the first conditional expression "C5" based on four single monitoring conditions and the second conditional expression "NOT C6" based on four single monitoring conditions are associated by the combination operational expressional "AND." In such a state, the display part 12 displays in parallel the first conditional expression "C5" and the second conditional expression "NOT C6" in two columns in the same row.

The second combined monitoring condition $C_7$ is a monitoring condition set to remove the possibility of a temporary increase in carrier pressure and identify the state of the process gas chromatography apparatus 20 as column deterioration based on the third condition above. That is, the second combined monitoring condition $C_5$ being met and the second combined monitoring condition $C_6$ not being met means that the holding time for only the column 1 among the two different column 1 and column 2 has become shorter, and the cause of the shortening of the holding time is not due to a temporary increase in carrier pressure. When the second combined monitoring condition $C_7$ is met, the cause of the abnormality is identified as column deterioration, and the display part 12 displays in parallel a comment of "column deterioration, replace column" showing it is necessary to replace the column in the row of the second combined monitoring condition $C_7$.

When the control part 16 determines that the combined monitoring condition is met, the notification part 15 may notify the user by any method. The notification performed by the notification part 15 of the monitoring device 10 according to one or more embodiments will be described in more detail while referencing FIG. 6 to FIG. 8.

Figure 6:
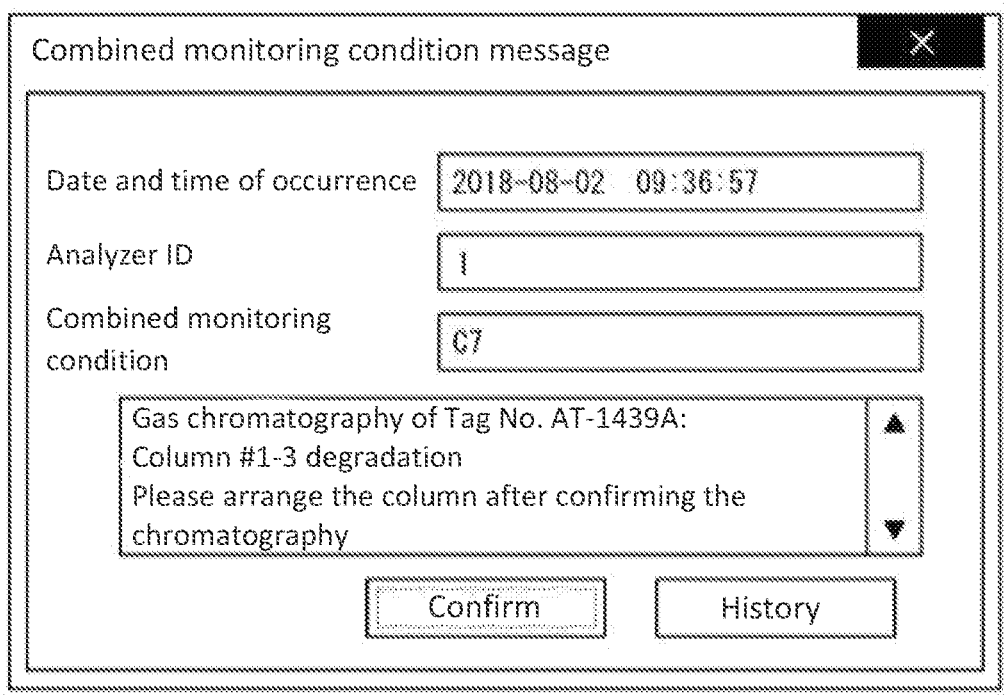
FIG. 6 shows a schematic diagram illustrating a first example of a notification to the user performed by the notification part of FIG. 1.

FIG. 6 shows a schematic diagram illustrating a first example of notification to the user performed by the notification part 15 of FIG. 1.

When referencing FIG. 6, the notification part 15 may notify the user, for example, by displaying a dialogue box on a screen constituting the display part 12. The display part 12 may display the dialogue box of FIG. 6 so as to be superimposed over a window illustrated in FIG. 5 in which a conditional expression is displayed. The display part 12 may display, for example, a date and time the combined monitoring condition is met, an analyzer ID, a number of the combined monitoring condition, and the like in the dialogue box. Furthermore, the display part 12 may also display comment details corresponding to the met combined monitoring condition in the dialogue box.

For example, in FIG. 6, the control part 16 determines that the second combined monitoring condition $C_7$ is met and that the first combined monitoring condition is met. At this time, the display part 12 displays a dialogue box displaying the comment details corresponding to the second combined monitoring condition $C_7$.

FIG. 7 shows a schematic diagram illustrating a second example of notification to the user performed by the notification part 15 of FIG. 1.

When referencing FIG. 7, the notification part 15 may highlight and display, for example, the row of the met second combined monitoring condition $C_n$ within the window illustrated in FIG. 5 in which the conditional expression is displayed. For example, in the example illustrated in FIG. 7, the second combined monitoring condition $C_5$ is met by the second combined monitoring conditions $C_1$ and $C_2$ being met, and the second combined monitoring condition $C_7$ is met by the second combined monitoring condition $C_6$ not being met. At this time, the display part 12 highlights and displays the rows of the second combined monitoring conditions $C_1$, $C_2$, $C_5$, and $C_7$. Meanwhile, the display part 12 does not highlight and display the rows of the second combined monitoring conditions $C_3$, $C_4$, and $C_6$ wherein the conditions are not met. The display part 12 is not limited hereto, and it may highlight and display together rows of conditions which are met and rows of conditions which are not met, in which case, it may display each row in a display color differing between rows.

Figure 8:
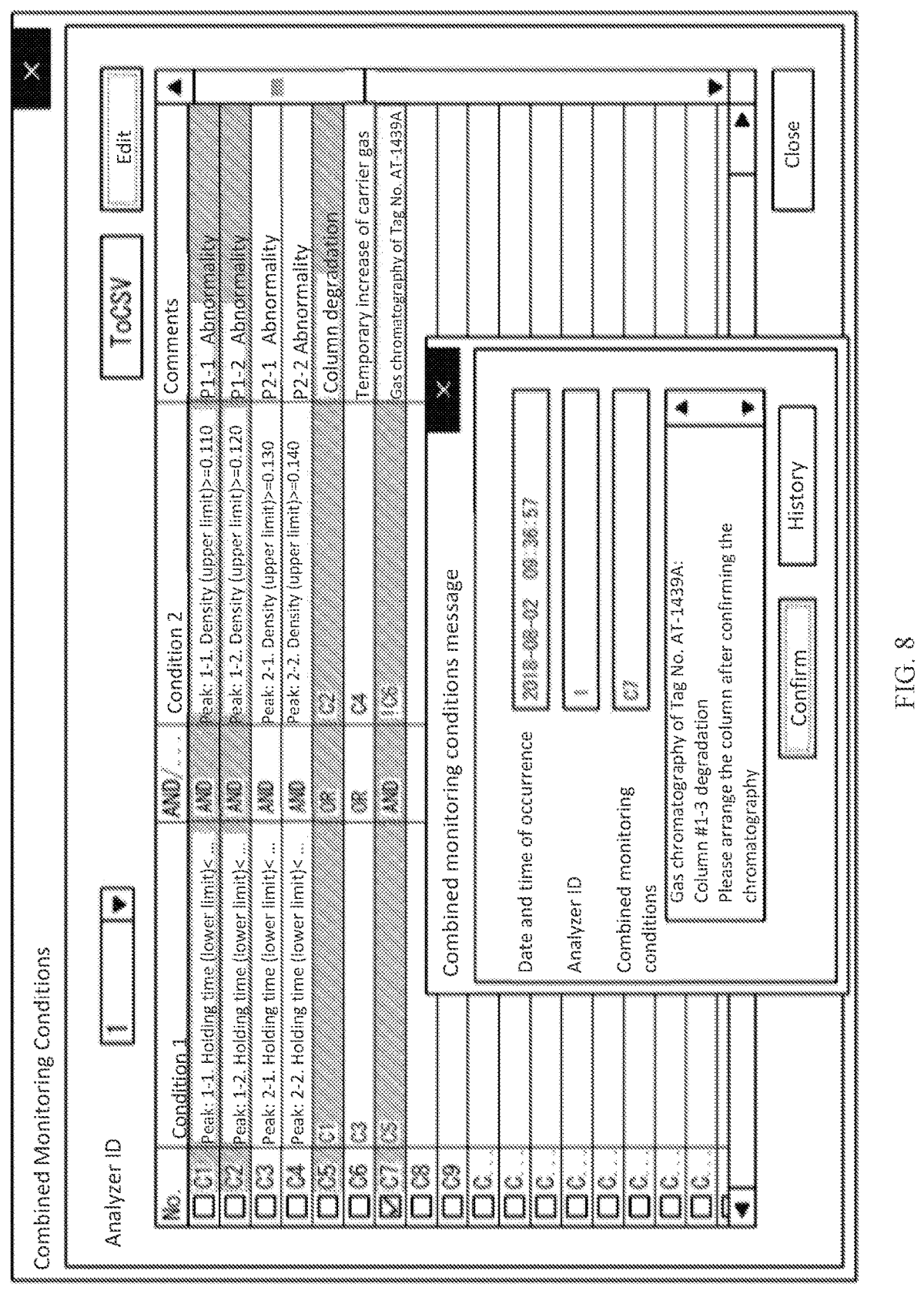

FIG. 8 shows a schematic diagram illustrating a third example of a notification to the user performed by the notification part 15 of FIG. 1.

When referencing FIG. 8, the notification part 15 may display, for example, a dialogue box on the screen constituting the display part 12 and highlight and display the row of the met second combined monitoring condition $C_n$ within the window illustrated in FIG. 5 in which the conditional expression is displayed. In the example illustrated in FIG. 8, the display part 12 is displaying the dialogue box of FIG. 6 superimposed on the window highlighted and displayed in FIG. 7.

As above, even when it is not possible to detect the state by actually installing a sensor in each constituent part of the column or the like in the process gas chromatography apparatus 20, making a determination by a combined monitoring condition combining a plurality of single monitoring conditions enables monitoring of the state of the process gas chromatography apparatus 20 that could not be grasped only by a single monitoring condition. Furthermore, even when the user does not grasp a combination of measurement data necessary for presumption, the user can easily identify the state of the process gas chromatography apparatus 20 using a display such as shown in FIG. 5. Thus, the user can easily grasp the details of the monitoring conditions even when combining a plurality of monitoring conditions. Accordingly, user convenience improves.

As in the example illustrated in FIG. 5, combining determinations of two monitoring conditions enables a complex logical determination to be easily grasped. For example, when simply arranging four conditions A, B, C, and D, as "A and B and C or D," it is unclear whether it is "(A and B and C) or D" or "(A and B) and (C or D)." According to the monitoring device 10 according to one or more embodiments, it is possible for the user to grasp the relationship between each conditional expression at a glance. Accordingly, the user can easily check the syntax of the program.

FIG. 9 is a schematic diagram illustrating, as an example, the screen when each conditional expression of FIG. 5 is disposed in one row. When referencing FIG. 9, the first combined conditional expression such as illustrated in the example of FIG. 5 is complex, and one row becomes extremely long. According to the monitoring device 10 according to one or more embodiments, solving such issues and displaying each conditional expression in two columns, enables the user to easily grasp the conditional expression even on a small screen, limited display region, or the like. There is a lower limit to the size of character the user can visually recognize. Accordingly, the shortening of the length of the conditional expression increases the size of the characters, and user visual recognition improves. Meanwhile, the proportion of the cell length of the condition 1 and the condition 2 compared to the screen overall becomes larger, and thus the number of characters that can be displayed at once increases, and user visual recognition further improves.

Additionally, improving user visual recognition makes input setting by the user easier. More specifically, the user can easily perform input setting of the single conditional expressions based on single monitoring conditions and of the combined conditional expressions based on combined monitoring conditions. Furthermore, when wanting to change the already inputted single conditional expressions or combined conditional expressions, the user can easily edit the single conditional expressions or combined conditional expressions.

Through the comment display on the screen illustrated in FIG. 5, the user can easily grasp the results of the combined monitoring condition, such as column deterioration. Even when the combined monitoring condition, such as column deterioration, is unmet and an abnormality of column deterioration has not occurred, comments about each process of the conditional expression used in the determination of column deterioration is displayed, and thus the user can easily grasp the state of the process gas chromatography apparatus 20 for each process. At this time, even when there is not an abnormality in the column, the user can grasp the state of other locations and that there is a possibility an abnormality has occurred in the location. Grasping these enables the user to quickly and accurately perform maintenance work.

A user viewing the monitoring condition screen of FIG. 5 can easily check whether a complex conditional expression is met or unmet. For example, the user can more intuitively grasp whether each conditional expression is met through notifications by the notification part 15. As a result, the user can grasp at a glance that the first combined monitoring condition will be met if which remaining monitoring conditions are met, and it becomes obvious which monitoring conditions the user should be mindful of.

The present invention is described based on various diagrams and embodiments, but please be mindful that it is easy for a person having ordinary skill in the art to perform various variations and revisions based on the present invention. Accordingly, please bear in mind that these variations and revisions are included in the scope of the present invention. For example, it is possible to redispose the functions or the like include in each means, each step, or the like such that they are not logically contradictory, and it is possible to combine multiple means, steps, or the like into one or to split them.

For example, the one or more embodiments of the present invention could also be realized as a program or memory medium storing a program wherein process details for realizing each function of the monitoring system 1 described above are described. Please understand that these are also included in the scope of the present invention.

Above, the display part 12 is described as displaying the first conditional expression and the second conditional expression in two columns, but the display method is not limited hereto. If the user can easily grasp it, the display part 12 may display, for example, each conditional expression in three columns or more.

Above, the control part 16 is described as determining both whether the second combined monitoring condition $C_n$ is met and whether the first combined monitoring condition is met, but it is not limited hereto. The control part 16 may determine only one or the other of whether the second combined monitoring condition $C_n$ is met and whether the first combined monitoring condition is met.

Above, the notification part 15 is described as notifying the user each time the second combined monitoring condition $C_n$ and first combined monitoring condition is met, but it is not limited hereto. The notification part 15 may omit notification in the second combined monitoring condition $C_n$ and only notify when the first combined monitoring condition is finally met, and it may omit notification in the first combined monitoring condition and only notify in each second combined monitoring condition $C_n$ of that step.

Above, the chromatography apparatus is described limited to the process gas chromatography apparatus 20, but the type of chromatography apparatus is not limited hereto. The monitoring system 1 may have a lab use gas chromatography apparatus instead of the commercial process gas chromatography apparatus 20, and it may have a liquid chromatography apparatus not for gas.

For example, also accumulating the findings relating to the state of the process gas chromatography apparatus 20 in the future has a possibility of a further increase in cases wherein deterioration and the like of constituent parts for which it is difficult to monitor their state by installing sensors can be monitored by combining single monitoring conditions. One or more embodiments of the present invention can also be applied in such cases.

LIST OF REFERENCE CHARACTERS

1 Monitoring system
10 Monitoring device
11 Communication part
12 Display part
13 Input part
14 Memory part
15 Notification part
16 Control part
20 Process gas chromatography apparatus
30 Network Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A non-transitory computer readable medium (CRM) storing computer readable program code for monitoring a state of a chromatography apparatus embodied therein that:
   receives one or more monitoring conditions that each include a determination condition for parameters related to measurements taken using the chromatography apparatus; and
   displays in parallel:
      a first conditional expression based on at least one of the monitoring conditions that make up a first combined conditional expression, and
      a second conditional expression based on at least one of the monitoring conditions, wherein
   the second conditional expression is associated with the first conditional expression in a combination operational expression, and
   the first combined conditional expression is based on a first combined monitoring condition that combines all of the received monitoring conditions.

2. The non-transitory CRM of claim 1, wherein the non-transitory CRM further stores computer readable program code that:
   determines the first combined conditional expression based on the first combined monitoring condition.

3. The non-transitory CRM of claim 1, wherein the non-transitory CRM further stores computer readable program code that:
   displays two portions of the first combined conditional expression, respectively, in two different columns; and
   further displays, in parallel and in a same row, the first conditional expression and the second conditional expression.

4. The non-transitory CRM of claim 3, wherein the non-transitory CRM further stores computer readable program code that:
   receives a comment related to a second combined monitoring condition based on a second combined conditional expression, wherein the second combined conditional expression is based on the first conditional expression, the combination operational expression, and the second conditional expression; and
   displays the comment in parallel in the same row as the first conditional expression and the second conditional expression.

5. The non-transitory CRM of claim 4, wherein the non-transitory CRM further stores computer readable program code that:
   receives, from the chromatography apparatus, information of the parameters;
   determines, based on the received information of the parameters, whether at least one of the first combined monitoring condition and the second combined monitoring condition is met, and
   notifies, based on the determination, that at least one of the first combined monitoring condition and the second monitoring condition is met.

6. The non-transitory CRM of claim 5, wherein the parameters comprise:
   operation parameters, for each part of a measurement system, used in measurements taken using a process gas chromatography apparatus, and
   analysis parameters for measurement results obtained by measurements taken using the process gas chromatography apparatus.

7. A monitoring device for monitoring a state of a chromatography apparatus, the monitoring device comprising:
   a processor connected to a memory, wherein the processor:
      receives one or more monitoring conditions that each include a determination condition for parameters related to measurements taken using the chromatography apparatus; and
      displays in parallel:
         a first conditional expression based on at least one of the monitoring conditions that make up a first combined conditional expression, and
         a second conditional expression based on at least one of the monitoring conditions, wherein
      the second conditional expression is associated with the first conditional expression in a combination operation expression, and
      the first combined conditional expression is based on a first combined monitoring condition that combines all of received monitoring conditions.

8. The monitoring device according to claim 7, wherein the processor further determines the first combined conditional expression based on the first combined monitoring condition.

9. The monitoring device according to claim 7, wherein the processor further:
   displays two portions of the first combined conditional expression, respectively, in two different columns; and
   displays, in parallel and in a same row, the first conditional expression and the second conditional expression.

10. The monitoring device according to claim 9, wherein the processor further:
    receives a comment related to a second combined monitoring condition based on a second combined conditional expression, wherein the second combined conditional expression is based on the first conditional expression, the combination operational expression, and the second conditional expression; and displays the comment in parallel in the same row as the first conditional expression and the second conditional expression.

11. The monitoring device according to claim 10, further comprising:
a communication circuit and a notification circuit that are connected to the processor, wherein the processor further:
receives, from the chromatography apparatus, information of the parameters;
determines, based on the received information of the parameters, whether at least one of the first combined monitoring condition and the second combined monitoring condition is met, and
notifies, based on the determination, that at least one of the first combined monitoring condition and the second monitoring condition is met.

12. The monitoring device according to claim 11, wherein the monitoring device is part of a monitoring system that comprises a process gas chromatography apparatus, the parameters comprise:
operation parameters, for each part of a measurement system, used in measurements taken using a process gas chromatography apparatus, and
analysis parameters for measurement results obtained by measurements taken using the process gas chromatography apparatus.

13. A method for monitoring a state of a chromatography apparatus comprising:
receiving one or more monitoring conditions that each include a determination condition for parameters related to measurements taken using the chromatography apparatus; and
displaying in parallel:
a first conditional expression based on at least one of the monitoring conditions that make up a first combined conditional expression, and
a second conditional expression based on at least one of the monitoring conditions, wherein
the second conditional expression is associated with the first conditional expression in a combination operational expression, and
the first combined conditional expression is based on a first combined monitoring condition that combines all of received monitoring conditions.

14. The method of claim 13, further comprising:
determining the first combined conditional expression based on the first combined monitoring condition.

15. The method of claim 13, further comprising:
displaying two portions of the first combined conditional expression, respectively, in two different columns; and
further displaying, in parallel and in a same row, the first conditional expression and the second conditional expression.

16. The method of claim 15, further comprising:
receiving a comment related to a second combined monitoring condition based on a second combined conditional expression, wherein the second combined conditional expression is based on the first conditional expression, the combination operational expression, and the second conditional expression; and
displaying the comment in parallel in the same row as the first conditional expression and the second conditional expression.

17. The method of claim 16, further comprising:
receiving, from the chromatography apparatus, information of the parameters;
determining, based on the received information of the parameters, whether at least one of the first combined monitoring condition and the second combined monitoring condition is met, and
notifying, based on the determination, that at least one of the first combined monitoring condition and the second monitoring condition is met.

18. The method of claim 17, wherein the parameters comprise:
operation parameters, for each part of a measurement system, used in measurements taken using a process gas chromatography apparatus, and
analysis parameters for measurement results obtained by measurements taken using the process gas chromatography apparatus.

* * * * *